US008080779B2

(12) United States Patent
Legras et al.

(10) Patent No.: US 8,080,779 B2
(45) Date of Patent: Dec. 20, 2011

(54) DEVICE FOR DETECTING INFRARED RADIATION COMPRISING A RESISTIVE IMAGING BOLOMETER, A SYSTEM COMPRISING AN ARRAY OF SUCH BOLOMETERS AND A METHOD FOR READING AN IMAGING BOLOMETER INTEGRATED INTO SUCH A SYSTEM

(75) Inventors: Olivier Legras, Voiron (FR); Christophe Minassian, Voreppe (FR)

(73) Assignee: ULIS, Veurey Voroize (FR)

( * ) Notice: Subject to any disclaimer, the term of this patent is extended or adjusted under 35 U.S.C. 154(b) by 168 days.

(21) Appl. No.: 12/545,300

(22) Filed: Aug. 21, 2009

(65) Prior Publication Data
US 2010/0065729 A1 Mar. 18, 2010

(30) Foreign Application Priority Data

Sep. 16, 2008 (FR) ...................................... 08 56209

(51) Int. Cl.
*G01D 18/00* (2006.01)
(52) U.S. Cl. ................ 250/252.1; 250/338.1; 250/338.3
(58) Field of Classification Search ............... 250/338.1, 250/338.3
See application file for complete search history.

(56) References Cited

U.S. PATENT DOCUMENTS

| 6,507,021 B1 * | 1/2003 | Brood ......................... 250/338.1 |
| 6,730,909 B2 * | 5/2004 | Butler ......................... 250/338.1 |
| 7,544,942 B2 * | 6/2009 | Ouvrier-Buffet et al. . 250/338.4 |
| 2007/0024290 A1 * | 2/2007 | Endoh ........................... 324/705 |

FOREIGN PATENT DOCUMENTS

| WO | 98/35212 | 8/1998 |
| WO | 01/84118 | 11/2001 |

OTHER PUBLICATIONS

Mottin et al., *Uncooled amorphous silicon technology enhancement for 25 μm pixel pitch achievement*, Proceedings of SPIE, vol. 4820, 2003, pp. 200-207.

* cited by examiner

*Primary Examiner* — David Porta
*Assistant Examiner* — Hugh H Maupin
(74) *Attorney, Agent, or Firm* — Burr & Brown

(57) ABSTRACT

A device for detecting infrared radiation including a resistive imaging bolometer, a mechanism for measuring drift in the electrical resistance of the bolometer relative to a reference value of the electrical resistance of the bolometer which corresponds to predetermined operating conditions of the bolometer, and a mechanism for correcting the effects of the drift in resistance or for correcting the drift itself.

23 Claims, 4 Drawing Sheets

DEVICE FOR DETECTING INFRARED RADIATION COMPRISING A RESISTIVE IMAGING BOLOMETER, A SYSTEM COMPRISING AN ARRAY OF SUCH BOLOMETERS AND A METHOD FOR READING AN IMAGING BOLOMETER INTEGRATED INTO SUCH A SYSTEM

FIELD OF THE INVENTION

The present invention relates to the field of infrared imaging and pyrometry using bolometers.

More especially, the present invention relates to a device for detecting infrared radiation comprising a resistive imaging bolometer. It also relates to a system comprising an array of such devices as well as a method for reading an imaging bolometer integrated into such a system.

DESCRIPTION OF THE PRIOR ART

In the field of infrared detectors, the use of devices configured in the form of an array and capable of operating at ambient temperature, i.e. not requiring cooling to extremely low temperatures, is known—in contrast to detecting devices referred to as "quantum detectors" which can only operate at extremely low temperatures, typically that of liquid nitrogen.

These uncooled detectors traditionally use the variation in a physical unit of an appropriate material as a function of temperature at around 300 K. In the case of bolometric detectors, this physical unit is electrical resistivity.

Such an uncooled detector generally includes:
means of absorbing the infrared radiation and converting it into heat;
means of thermally isolating the detector so that its temperature can rise due to the effect of the infrared radiation;
thermometric means which, in the context of a bolometric detector, use a resistance element;
and means of reading electrical signals provided by the thermometric means.

Detectors designed for infrared imaging are conventionally produced as a one- or two-dimensional array of elementary detectors, or bolometers, with each elementary detector of said array being formed by a membrane that is suspended above a substrate, which is generally made of silicon, by means of support arms.

The substrate usually incorporates means of sequentially addressing the elementary detectors, means of electrically exciting the elementary detectors and means of pre-processing the electrical signals generated by these elementary detectors. These means of sequential addressing, electrical excitation and pre-processing are therefore formed on the substrate and constitute a read circuit.

In order to obtain a scene using this detector, the image of the scene is projected through suitable optics onto the array of elementary detectors and clocked electrical stimuli are applied via the readout circuit to each of the elementary detectors or to each row of such detectors in order to obtain an electrical signal that constitutes an image of the temperature reached by each of said elementary detectors. This electrical signal is directly linked to the electrical resistance of each elementary detector. This signal is then processed to a greater or lesser extent by the readout circuit and then, if applicable, by an electronic device outside the package in order to generate a thermal image of the observed scene.

However, generally speaking, it is found that the electrical resistance of the bolometric materials which are usually used to fabricate an imaging bolometer, e.g. amorphous silicon (a-Si) or vanadium oxide (Vox), drifts to a greater or lesser extent over time.

In the context of the present invention, the term "drift" denotes the fact that, under given environmental and operating conditions, hereinafter referred to as "reference conditions", e.g. incident radiation on the bolometer, ambient temperature for the bolometer and electrical read signals, the electrical resistance of the imaging bolometer slowly deviates over time from its initial value, which is called the observed reference value under such conditions. This reference value can be measured under reference conditions when the detector is put into service, before it is put into service or during a special operation referred to as calibration.

One reason for such drift is the natural relative instability of the thermometric materials that are traditionally used; this instability can result in variations in resistivity which are not negligible compared to the accuracy of the images or thermal measurements which one intends to produce or make. This type of drift usually applies across the board to all the pixels of the detector and results in overall calibration drift.

Drifts in resistance caused by excessive illumination of the detector by high luminous flux, such as, for instance, when observing a source of intense radiation (sun, spotlight, etc.) for an excessively long time, also deserve mention. These sources of drift are detrimental to the quality of the thermal images produced by the detector. This type of drift usually applies locally to a confined portion of the sensitive surface of the detector and results in spatially dispersed detector calibration error.

SUMMARY OF THE INVENTION

The object of the present invention is therefore to produce a detector which remains accurate, i.e. correctly calibrated, and, more specifically, a detector whereof the output signals remain identical when the detector is subsequently subjected to so-called reference conditions throughout its life cycle, even when its sensitive elements are affected by spatial and/or temporal drift.

To achieve this, the object of the invention is a device for detecting infrared radiation comprising a resistive bolometer.
According to the invention, this device comprises:
means for measuring drift in the electrical resistance of said bolometer relative to a reference value of the electrical resistance of said bolometer which corresponds to predetermined operating conditions of said bolometer; and
means for correcting the effects of said drift or means of correcting said drift in resistance.
According to one embodiment of the invention, the measurement means comprise:
a reference resistive bolometer which is affected by said drift;
means for measuring the electrical resistance of the reference bolometer; and
means for determining said drift as a function of the measured electrical resistance.
More especially, the reference bolometer is a compensation bolometer associated with the imaging bolometer.
Alternatively, the reference bolometer is the imaging bolometer.
According to one embodiment of the invention, the means of measuring the electrical resistance of the reference bolometer comprise:
means for integrating a current that flows through the reference bolometer; and means for determining the electrical resistance of the reference bolometer as a function of the current that is integrated by the integration means.

According to one embodiment of the invention, the means of measuring the electrical resistance of the reference bolometer comprise:
- a resistor having a predetermined electrical resistance capable of being connected to the reference bolometer;
- means for integrating a difference in the currents that flow through the reference bolometer and the resistor; and
- means for determining the electrical resistance of the reference bolometer as a function of the difference in the currents integrated by the integration means.

More especially, a circuit for measuring the electrical resistance of the imaging bolometer by integrating a current that throws through the latter and which is designed to measure an infrared radiation temperature and the integration means belong to said measuring circuit.

According to one embodiment of the invention, the correction means comprise means of controlling the temperature of the imaging bolometer in order to compensate said drift.

According to one embodiment of the invention, the device also comprises means of measuring an electrical resistance of the imaging bolometer and means (30) of determining a temperature of the incident radiation on the bolometer as a function of the electrical resistance measured and at least one parameter which depends on the electrical resistance of the imaging bolometer and the correction means are capable of correcting said at least one parameter as a function of the drift measured in order to correct the latter's effect on the temperature determination.

According to one embodiment of the invention, said at least one parameter is an electrical sensitivity to temperature of a circuit for measuring the electrical resistance of the imaging bolometer.

The object of the invention is also a system which comprises at least one row of devices for detecting said radiation.

According to the invention, these devices are each of the above-mentioned type.

The object of the invention is also a method for reading a resistive bolometer in an array of bolometers that constitute a system for detecting infrared radiation, said method involving:
- a step to measure drift in the electrical resistance of said bolometer relative to a reference value of the electrical resistance of said bolometer which corresponds to predetermined operating conditions of said bolometer; and
- a step to correct the effects of said drift or a step to correct the drift in resistance.

BRIEF DESCRIPTION OF THE DRAWINGS

The invention is made more readily understandable by the following description which is given merely by way of example and relates to the accompanying drawings in which identical references relate to identical or analogous components and in which.

DESCRIPTION OF THE PREFERRED EMBODIMENTS

Figure 1:
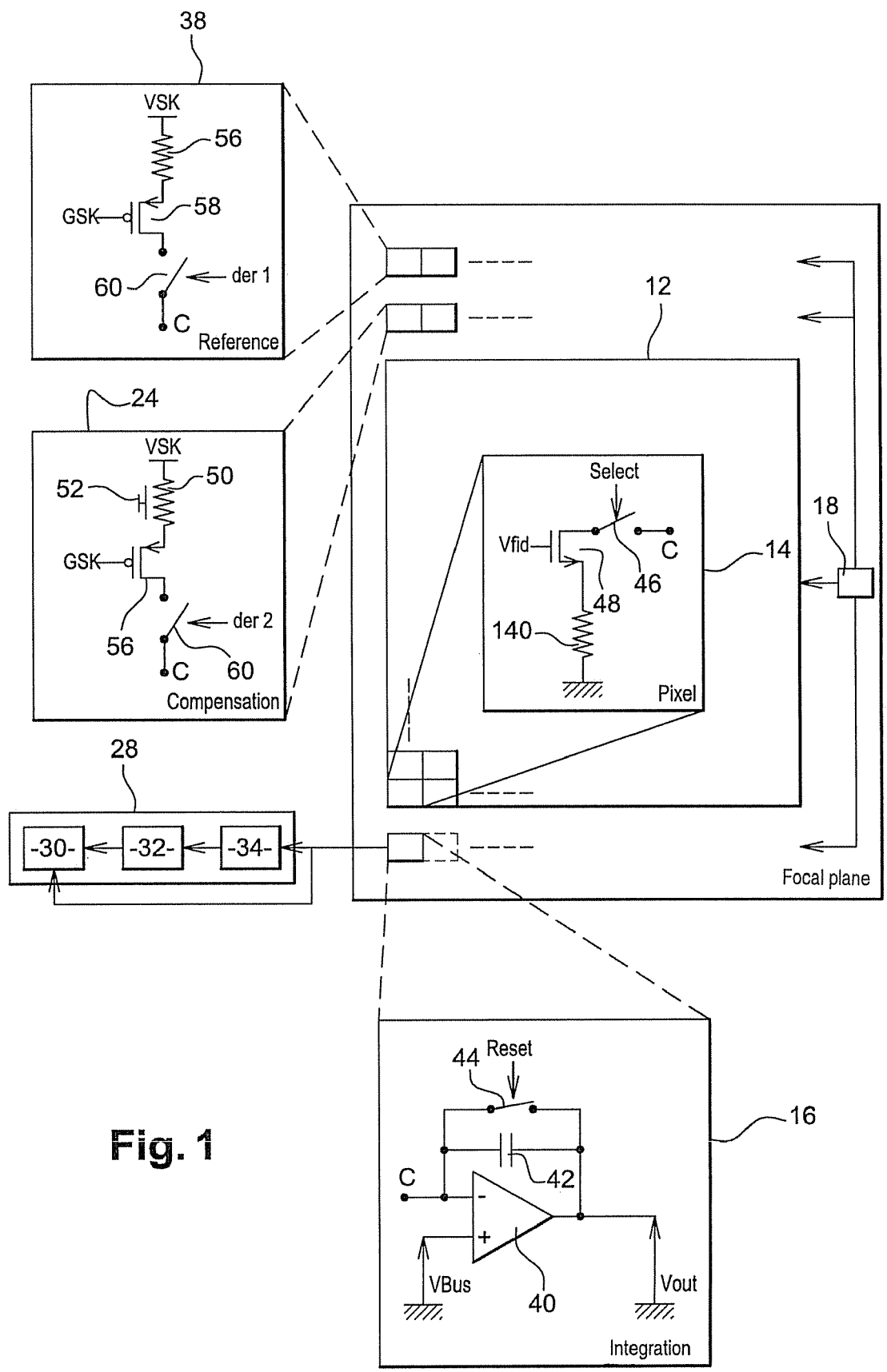
FIG. 1 is a schematic view of a bolometric detector in accordance with a first embodiment and a second embodiment of the invention.

FIG. 1 schematically shows a bolometric detector 10. Such a detector 10 comprises:
- a two-dimensional array 12 comprising $\underline{n}$ rows and $\underline{m}$ columns of imaging pixels 14, each comprising a resistive bolometer 140, where $\underline{n}$ and $\underline{m}$ are integers equal to or greater than 1. The imaging array 12 is arranged in the focal plane of optics that are transparent to infrared radiation (not shown);
- a row of compensation circuits 24, each one being associated with a column of array 12 and comprising a compensation bolometer 50;
- a row of integrators 16, each one associated with a column of array 12;
- a row-by-row addressing circuit 18 of array 12;

As is known in itself, the resistive bolometers and compensation bolometers 140, 50 usually consist of a membrane that is suspended by support arms above a substrate in which the various electronic components needed for reading are formed. These electronic components are usually referred to by the term "read circuit".

Such a bolometric detector structure is classic and is not explained in further detail below. For additional information, the reader is advised to consult, for example, the document entitled "*Uncooled amorphous silicon enhancement for 25 µm pixel pitch achievement*" by E. Mottin et al, Infrared Technology and Application XXVIII, SPIE, vol. 4820.

According to the invention, this structure is supplemented by:
- an information processing unit 28 connected to integrators 16 and comprising a unit 30 which uses an algorithm to process the signals output by the integrators in order to determine an infrared image projected onto array 12. To achieve this, unit 28 uses calculation parameters including one or more values of the electrical sensitivity of integrators 16 to the temperature of the scene, these values being stored in a memory bank of unit 32. Unit 28 also comprises a correction unit 34 which compensates the measured drift of imaging bolometers 14, as explained in greater detail below; and
- a row of drift circuits 38, each one associated with a column of array 12;

Drift circuits 38 associated with integrators 16 together form a module for measuring the drifts of the bolometers in array 12 as will be explained in greater detail below.

First Embodiment

Figure 2:
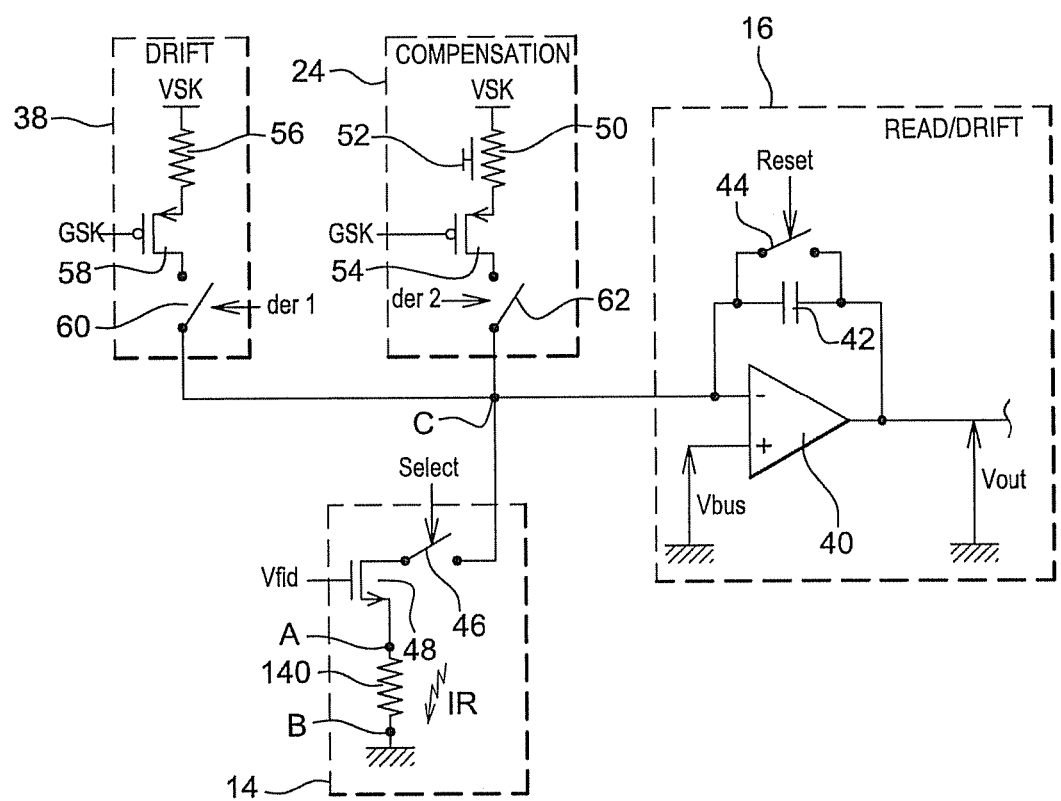
FIG. 2 is a schematic view of a basic circuit layout involved in building the detector in FIG. 1.

FIG. 2 shows a basic layout of detector 10 in accordance with a first embodiment comprising:
- an imaging pixel 14 of array 12;
- an integrator 16 for measuring bolometer 140 of imaging pixel 14;
- a compensation circuit 24 for compensating the common-mode current that flows through imaging bolometer 140 when the latter is read; and
- a drift circuit 38 for measuring the drift in the electrical resistance of bolometer 140.

Integrator 16 comprises:

- an operational amplifier 40, the non-inverting input (+) of which is kept at a predetermined constant voltage Vbus;
- a capacitor 42, having a predetermined capacitance $C_{int}$ and connected between the inverting input (−) of amplifier 40 and the output of the latter;
- a reset switch 44 connected in parallel with capacitor 42 and controllable by means of a "Reset" signal controlled by addressing circuit 18.

Circuit or "pixel" 14 comprises a bolometer 140 which is subjected to infrared radiation IR originating from a scene and is connected to a constant potential (similar to the ground in the Figures) by a first terminal A. The pixel also comprises:

- a readout switch 46, controllable by means of a "Select" signal controlled by addressing circuit 18, one terminal of which is connected to the inverting input (−) of the operational amplifier; and
- a first MOS injection transistor 48, the gate of which is kept at a constant predetermined voltage Vfid, the source of which is connected to a second terminal B of bolometer 140 and the drain of which is connected to the other terminal of readout switch 46.

Compensation circuit 24 used to compensate the common-mode current that flows through imaging bolometer 140 comprises a resistive compensation bolometer 50 made of the same material as imaging bolometer 140 and having a negligible thermal resistance compared to the substrate and, optionally, fitted with shielding 52 to protect it against radiation originating from the scene.

One of the terminals of compensation bolometer 50 is connected to a predetermined voltage VSK and its other terminal is connected to the source of a second MOS injection transistor 54 of circuit 24. The drain of transistor 54 is connected to the inverting input of operational amplifier 40 and its grid is connected to a predetermined voltage GSK.

Drift circuit 38 comprises a resistor 56 and a third MOS injection transistor 58, arranged similarly to compensation bolometer 50 and second injection transistor 54.

Drift circuit 38 also comprises a first drift measuring switch 60 located between third MOS transistor 58 and the inverting terminal (−) of operational amplifier 40, said switch being controllable by addressing circuit 18 by means of a "Der1" signal.

Finally, the compensation circuit is also associated with a second drift measuring switch 62 located in compensation circuit branch 24 which is controllable by timer circuit 18 by means of signal "Der2" and located between second transistor 54 and the inverting terminal (−) of operational amplifier 40.

Resistance 56 is chosen so as to present a predetermined constant electrical resistance value $R_{ref}$ over the range of temperatures to which imaging bolometer 140 is subjected. More especially, resistor 56 presents an electrical resistance value which is substantially equal to that of imaging bolometer 140 under the initial reference conditions. The electrical resistance value $R_{ref}$ is stored in memory bank 32 of information processing unit 28.

During a read cycle to read a row of imaging array 12 in order to determine the temperature of the scene detected by the array, first drift measuring switch 60 is opened and second drift measuring switch 62 is closed. Reset switch 44 which is closed during the preliminary zero reset cycle of capacitor 42 is flipped to its open state by timer circuit 18. The timer circuit then closes read select switch 46. The difference between the current that flows through imaging bolometer 140 and the current that flows through compensation bolometer 50 is integrated by capacitor 42. When a predetermined integration period $T_{int}$ has elapsed after the closing of read switch 46, timer circuit 18 then opens the read switch. The voltage $V_{out}$ on the output of integrator 16 is then given by the equation:

$$V_{out} = V_{bus} + \frac{1}{C_{int}} \int_0^{\Delta T_{int}} (i_{imag}(t) - i_{comp}(t)) dt \quad (1)$$

where t is the time, $i_{imag}$ is the current that flows through imaging bolometer 140 and $i_{comp}$ is the current that flows through compensation bolometer 50.

Because the current $i_{comp}$ that flows through compensation bolometer 50 is substantially equal to the common-mode current that flows through imaging bolometer 140, the difference between the electrical resistance of imaging bolometer 140 and the resistance of compensation bolometer 50 which causes the current difference on the input of integrator 16 is then substantially representative of the variation $\Delta R_{imag}$ in the electrical resistance $R_{imag}$ of imaging bolometer 140 which is caused by the radiation originating from the scene and which impinges on the imaging bolometer.

Voltage $V_{out}$ is then applied to arithmetic and logic unit 30 of information processing unit 28, for example subsequent to a sampling-blocking sequence and then multiplexing to one or more serial output amplifier(s), as known to those skilled in the art.

ALU 30 then determines a temperature $\theta_{scene}$ of the infrared radiation (IR) which impinges on imaging bolometer 140 as a function of voltage $V_{out}$ and calibration parameters, including the sensitivity S of voltage $V_{out}$ relative to the temperature of the scene of detector 10 stored in memory bank 32.

The calibration parameters are obtained during an initial phase referred to as calibration, typically by exposing detector 10 to two black bodies brought to spatially uniform known temperatures so as to provide access to two-dimensional, so-called gain/offset tables which are familiar to those skilled in the art. Each element in these tables corresponds to an elementary detector of the imaging array. The terms "gain", "sensitivity" and "electrical response" used here refer to the quantity $S = \Delta V_{out}/\Delta \theta_{scene}$ which is usually expressed in millivolts per degree Kelvin.

It has been demonstrated that this sensitivity S of detector 10 is expressed, generally speaking as a first-order approximation and for low variations in resistance, by the equation:

$$S = \frac{1}{R_{imag} \times C_{int}} \times V_{imag} \times T_{int} \times TCR \times R_{th} \times \Phi(\theta_{scene}) \quad (2)$$

where:
- $R_{imag}$ is the reference electrical resistance of bolometer 140 under the predetermined reference conditions;
- $V_{imag}$ is a bias voltage across the terminals of bolometer 140 when the latter is read;
- TCR is the electrical resistance variation coefficient of bolometer 140 as a function of the latter's temperature;
- $R_{th}$ is the thermal resistance between bolometer 140 and the substrate above which it is suspended; and
- $\Phi(\theta_{scene})$ is the energy flux absorbed by bolometer 140, this flux being a function of the temperature of the scene $\theta_{scene}$.

As is apparent, sensitivity S is, as a first-order approximation, inversely proportional to the value $R_{imag}$. It is therefore evident that if quantity $R_{imag}$ drifts, this falsifies the result of measuring temperature $\theta_{scene}$.

The layout and operation of the components described above in relation to reading imaging bolometer 140 are conventional and are not explained in any greater detail here for the sake of brevity. For additional details, the reader is advised to consult, for example, the document entitled "*Uncooled amorphous silicon enhancement for 25 µm pixel pitch achievement*" by E. Mottin et al, Infrared Technology and Application XXVIII, SPIE, vol. 4820.

Figure 3:
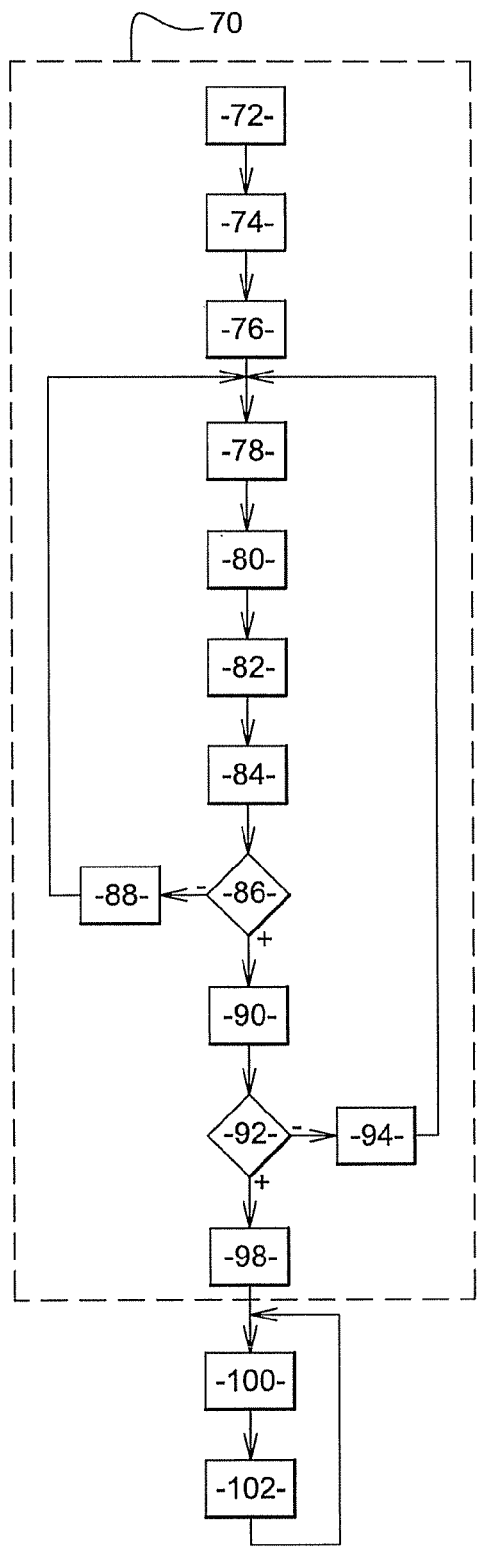
FIG. 3 is a flowchart of a method for measuring and compensating drift in accordance with the first embodiment.

A method for measuring and compensating drift in the electrical resistances of imaging bolometers 140 of imaging array 12 used by a detector 10 having the layout shown in FIG. 2 is described below, making reference to the flowchart in FIG. 3.

A first initialization step 70, conducted before detector 10 is first used, typically at the factory, involves determining the initial values of the electrical resistances of imaging bolometers 140 in array 12 under predetermined reference conditions.

To achieve this, in 72, detector 10 is subjected to the reference conditions throughout the duration of the resistance measurements. Step 72 involves, in particular, imposing a known uniform temperature $\theta_{ref}$ on detector 10 and subjecting the latter to known uniform thermal illumination $\Phi_{ref}$. For this purpose, detector 10 is, for instance, equipped with a system for controlling the temperature of its focal plane and a shutter, which is known per se. During step 72, the temperature control system raises imaging array 12 to temperature $\theta_{ref}$ and the shutter is closed so that the array is exposed to reference illumination $\Phi_{ref}$.

Then, in 74, a row counter $N_{line}$ and a metering counter $N_{measure}$ of timer circuit 18 are initialized at the value "1".

In 76, timer circuit 18 opens the read switches 46 of row $N_{line}$ of array 12. Timer circuit 18 also opens first and second drift measuring switches 60, 62 and closes reset switches 44 of the row of integrating circuits 16. Capacitors 42 of integrators 16 then discharge almost instantaneously.

In 78, timer circuit 18 then closes the read switches 46 of row $N_{line}$ of array 12. In addition, timer circuit 18 closes first drift measuring switches 60 and opens reset switches 44 of the row of integrators 16. For each layout of the row $N_{line}$ shown in FIG. 2, the difference between current $i_{imag}$ that flows through imaging bolometer 140 and the current $i_{ref}$ that flows through reference resistance $R_{ref}$ 56 therefore starts to be integrated by capacitor 42.

Once period $T_{int}$ has elapsed, timer circuit 18 opens, in 80, the read switches 46 of row $N_{line}$ as well as the first drift measuring switches 60 of the row of drift circuits 38. Voltage $V_{out}$ on the output of an integration circuit 16 in a layout shown in FIG. 2 is then given by the equation:

$$V_{out} = V_{bus} + \frac{1}{C_{int}} \int_0^{T_{int}} (i_{imag}(t) - i_{ref}(t)) dt \qquad (3)$$

This voltage $V_{out}$ is then saved after transfer by conventional means, in 82, by correction unit 34 of information processing unit 28. Still in 82, unit 34 determines, as a function of voltage $V_{out}$, the difference between the electrical resistance $R_{imag}$ of imaging bolometer 140 and the electrical resistance $R_{ref}$ of reference resistor 56.

Then, knowing the value $R_{ref}$ which is stored in memory bank 32 of unit 28, unit 34 determines the electrical resistance $R_{imag}$ of imaging bolometer 140. The computed value $R_{imag}$ is then, in 84, stored in memory bank 32.

In a subsequent, optional step 86, a test is performed to ascertain whether the value of a metering counter $N_{measure}$ equals a predetermined value $N_{measure}^{max}$. If it does not, timer circuit increments, in 88, counter $N_{measure}$ by "1", then step 88 loops back to step 76 for a new read cycle to read row $N_{line}$.

If the test performed in 86 is positive, correction unit 34 forms, in 90 and for each imaging bolometer 140 in row $N_{line}$, the time-averaged $\overline{R}_{imag}$ of the $N_{measure}^{max}$ last electrical resistance values computed $R_{imag}$. The average $\overline{R}_{imag}$ is then stored in memory bank 32.

A test is then performed in 92 to ascertain whether the value of row counter $N_{line}$ equals the number of rows n in array 12. If it does not, the timer circuit increments, in 94, the value of this counter by "1" and step 94 loops back to step 76 to read the next row.

If it does, all the electrical resistances of imaging bolometers 140 have been read and the method continues with step 98 in which the value $\overline{R}_{imag}$ of each imaging bolometer 140 is stored in memory bank 32 in a reference table of electrical resistances $R_{imag}^{ref}$ of imaging bolometer 140 when subjected to the reference conditions.

The advantage of time-averaging the measured electrical resistance values is the fact that it is possible to filter out measurement noise from the average. The average value makes it possible to obtain a more accurate measured electrical resistance value.

This completes initialization step 70. At this stage, memory bank 32 therefore contains an array of electrical resistance reference values $R_{imag}^{ref}$ for bolometers 140 of array 12.

In addition and in accordance with a read cycle similar to the means of timer circuit 18, the sensitivities $S_{init}$ of the n times m imaging bolometers 140 are measured using a standard state-of-the-art method with two radiation sources (uniform black bodies) having different temperatures and the sensitivities are stored in memory bank 32. The sensitivity table $S_{init}$ is copied to a table S in memory bank 32 and is used as an operational sensitivity table for deploying the detector.

Once detector 10 has been put into service, the method continues with step 100 to measure the resistance drift of each imaging bolometer 140 in array 12, followed by step 102 in order to correct these drifts.

Drift measurement and correction steps 100, 102 are triggered regularly and/or periodically, for example, or at the request of the user of detector 10 when the user suspects that detector 10 is being adversely affected by drift.

More especially, drift measurement step 100 comprises above-mentioned steps 72 to 94. On completion of step 100, a new average measurement $\overline{R}_{imag}$ of the electrical resistance of each imaging bolometer 140 is therefore stored in memory bank 32 of information processing unit 28.

In correction step 102, correction unit 34 of unit 28 then modifies the electrical sensitivity table S in memory bank 32 by multiplying each of the elements in the table $S_{init}$ by the corresponding ratio $$\frac{\overline{R}_{imag}^{ref}}{\overline{R}_{imag}}$$

and storing the resulting table S in unit 32, which becomes the new operational table.

Step 102 then loops back, at predetermined time intervals, to step 100 in order to measure and correct new drifts of imaging bolometers 140 of array 12. The time interval can typically be of the order of one month or one year.

As is apparent, the first embodiment of the invention has the advantage of making it unnecessary to "actively" correct the drift of the imaging bolometers.

The first embodiment is applicable to microbolometer arrays in order, for example, to modulate or cancel spatial sensitivity variation phenomena associated with differential drift in resistances from one microbolometer to another (such as that typically produced by local blooming). In this case, it is advantageously, but not necessarily, the entire table of individual sensitivities (referred to as a gain table by those familiar with this field) which is re-updated thanks to the suggested implementation. Those familiar with this field will appreciate that rather than recalibration, a much more onerous operation, this involves an "arithmetic" process to stabilize the gain table. This way, the accuracy of the sensitivity of each imaging pixel is preserved over time for extremely long periods, without any recalibration.

It should be noted that, in the first embodiment, correcting drift in the electrical resistances of imaging bolometers 140 requires accurately reconstituting, during each drift measurement, the reference conditions that prevailed at the time the first "reference" measurement of the resistances $R_{imag}^{ref}$ was made. These conditions are obtained directly by providing a temperature controller in the detector and a shutter—these are traditional means in this field. However, in some cases this may prove awkward for the user.

Second Embodiment

Inventors have noticed that, in the vast majority of cases, changes in the drift of compensation bolometers 50 over time is substantially the same as the changes encountered with imaging bolometers 140. This may well be explained by the fact that both types of structures are deliberately and advantageously fabricated using the same layer(s) of sensitive material which then undergo substantially the same thermal history.

However, compensation bolometers 50 are designed to be relatively insensitive and ideally completely insensitive to radiation originating from the scene. The second embodiment advantageously exploits this feature by measuring the drift of the compensation bolometers and by correcting the drift of imaging bolometers 140 as a function of the drift measured on compensation bolometers 50. This therefore avoids having to specify special illumination (infrared flux) conditions when measuring drift because compensation bolometers 50 are insensitive to it. This therefore means greater ease of use for the user and/or there is no need to provide means of specifying illumination, such as a shutter for example, even though it is advantageous to provide such means.

According to this second embodiment, the basic layout of detector 10, comprising imaging bolometer 140, integrator 16, compensation circuit 24 and drift circuit 38, is identical to that in FIG. 2.

This second embodiment therefore differs from the first embodiment in terms of the method that it uses. This method is illustrated by the flowchart in FIG. 4.

The method starts with phase 112 to measure the electrical resistances of compensation bolometers 50 in row of circuits 24.

This phase 112 comprises step 114 in which detector 10 is subjected to predetermined conditions throughout the duration of measurement of the resistances. These conditions, for this embodiment, involve imposing known uniform temperature $\theta_{ref}$ on detector 10.

Then, in 116, a metering counter $N_{measure}$ of timer circuit 18 is initialized at "1" and all the read switches 46 of array 12 are opened by timer circuit 18.

Then, in 118, timer circuit 18 opens first and second drift measuring switches 60, 62 and closes reset switches 44 of the row of integrating circuits 16. Capacitors 42 of integrators 16 discharge substantially instantaneously.

Then, timer circuit 18 closes, in 120, first and second drift measuring switches 60, 62 and opens reset switches 44 of the row of integrating circuits 16. For each layout of compensation circuit 24, drift circuit 38 and integrator 16 shown in FIG. 2, the difference between current $i_{comp}$ that flows through compensation bolometer 50 and current $i_{ref}$ that flows through reference resistor 56 therefore starts to be integrated by capacitor 42.

Once period $T_{int}$ has elapsed, timer circuit 18 opens, in 122, first and second drift measuring switches 60, 62 of the row of drift circuits 38. Voltage $V_{out}$ on the output of measuring circuit 22 in the layout shown in FIG. 2 is then given by the equation:

$$V_{out} = V_{bus} + \frac{1}{C_{int}} \int_0^{T_{int}} (i_{comp}(t) - i_{ref}(t)) dt \quad (4)$$

This voltage $V_{out}$ is then saved after transfer by conventional means, in 124, by correction unit 34 of information processing unit 28. Still in 124, unit 34 then determines, as a function of voltage $V_{out}$, the difference between an electrical resistance $R_{comp}$ of compensation bolometer 50 and the electrical resistance $R_{ref}$ of resistor 56. Then, knowing the value $R_{ref}$ which is stored in memory bank 32 of unit 28, unit 34 determines the electrical resistance $R_{comp}$ of compensation bolometer 50. The computed value $R_{comp}$ is then, in 126, stored in memory bank 32.

In a subsequent, optional step 128, a test is performed to ascertain whether the value of a metering counter $N_{measure}$ equals the value $N_{measure}^{max}$. If it does not, timer circuit 18 increments, in 130, counter $N_{measure}$ by "1", then step 130 loops back to step 118 for a new read cycle to read a row of compensation bolometers 50.

If the test performed in 128 is positive, compensation unit 34 forms, in 132 and for each compensation bolometer 50 in the row of compensation circuits 24, the average $\overline{R}_{comp}$ of the last $N_{measure}^{max}$ electrical resistance values computed $R_{comp}$.

The average $\overline{R}_{comp}$ is then stored in 134 in a space dedicated to memory bank 32 as reference electrical resistance value $\overline{R}_{comp}^{ref}$ of compensation bolometer 50.

In addition and in accordance with a read cycle similar to the means of timer circuit 18, the responses $S_{init}$ of the n times m imaging bolometers 140 are measured using the standard state-of-the-art method with two uniform radiation sources having different temperatures and the responses are stored in memory bank 32. Table $S_{init}$ is then copied to operational table S.

Once the detector has been put into service, the method continues with step 136 to measure the resistance drift of each row in imaging array 12, followed by step 138 in order to correct this drift. Drift measurement and correction steps 136, 138 are triggered regularly and/or periodically, for example, or at the request of the user of detector 10 when the user suspects that detector 10 is being adversely affected by drift.

More especially, drift measurement step 136 comprises above-mentioned steps 114 to 132. On completion of step 132, a new averaged measurement $\overline{R}_{comp}$ of the electrical resistance of each compensation bolometer 50 is therefore stored in memory bank 32 of information processing unit 28.

In correction step 138, correction unit 34 of unit 28 then recalculates the operational electrical sensitivity table S in memory bank 32 by multiplying each of the elements in the table $S_{init}$ by the corresponding ratio $$\frac{R_{comp}^{ref}}{R_{comp}}.$$

In the first and second embodiments, integrators 16 which are usually present in detector 10 to read imaging array 12 are used to measure the drifts of the array.

The value of the capacitance $C_{int}$ of capacitors 42 is conventionally selected in order to integrate a difference between the current that flows through an imaging bolometer 140 and that which flows through a compensation bolometer 50.

Because of this, it is necessary to use drift circuits 38 which each comprise a resistance 56 which is close to resistances 140 or 50 so that capacitors 42 do not saturate when measuring the drift of imaging bolometers 140.

However, using such a resistor 56 makes this measurement less accurate, for example, due to inaccuracy associated with technological dispersion which affects the electrical resistance value $R_{ref}$ of the resistor.

According to a third and a fourth embodiment which are described below, measuring the drift of imaging bolometers 140 is achieved by measuring their absolute electrical resistance.

Third Embodiment

Figure 5:
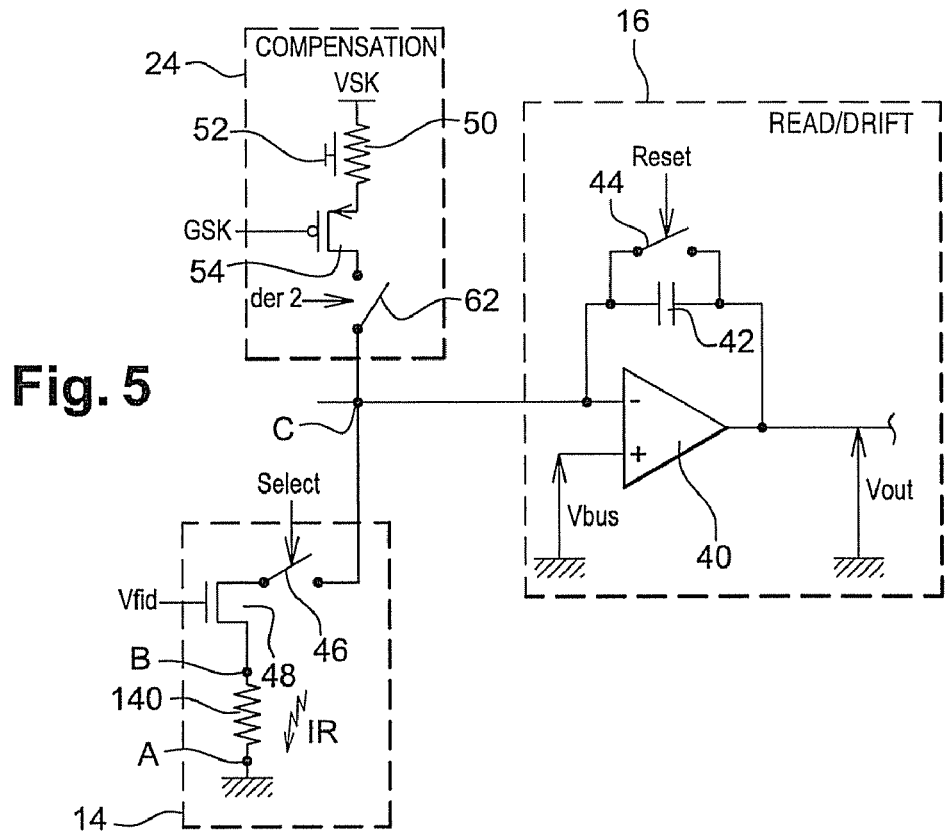
FIG. 5 is a schematic view of a basic circuit layout of a third embodiment and a fourth embodiment of the invention.

As shown in FIG. 5 which illustrates the third embodiment, the components of the latter differ from the two embodiments described in relation to FIGS. 1 and 2 in that drift circuits 38 are omitted. The basic layout of detector 10 therefore comprises pixel 14, integrator 16 and compensation circuit 24.

The third embodiment uses a method similar to that of the first embodiment described above in relation to FIG. 3.

The main difference is the fact that, when measuring the drift of bolometer 140, the current integrated by capacitor 42 is no longer the difference between the current that flows through imaging bolometer 140 and reference resistance 56; it is actually the current that flows through imaging bolometer 140.

The second difference is the fact that the integration period is reduced in order to prevent capacitor 42 from saturating. Thus, at the end of an integration cycle, voltage $V_{out}$ on the output of integrator 16 is given by the equation:

$$V_{out} = V_{bus} + \frac{1}{C_{int}} \int_0^{T'_{int}} i_{imag}(t)dt \qquad (5)$$

where $T'_{int}$ is a reduced integration period selected in order not to saturate capacitor 42 when measuring the drift of an imaging bolometer 140. Arithmetic and logic unit 34 then determines an electrical resistance $R_{imag}$ of imaging bolometer 140 as a function of voltage $V_{out}$.

Alternatively, rather than reducing the integration period, the capacitance value $C_{int}$ of capacitors 42 is increased so that they do not saturate during an integration period $T_{int}$.

For example, integrator 16 comprises two capacitors, the first capacitor being selected by timer circuit 18 when reading imaging array 12 and the second capacitor being selected when measuring the drift of imaging bolometers 140.

Fourth Embodiment

In the fourth embodiment, measuring and correcting the drift of imaging bolometers 140 is performed on the basis of measuring the drift of compensation bolometers 50 in order to exploit the same advantages as those mentioned for the second embodiment.

To achieve this, in the fourth embodiment, the basic layout of detector 10 is identical to that in FIG. 5.

Figure 4:
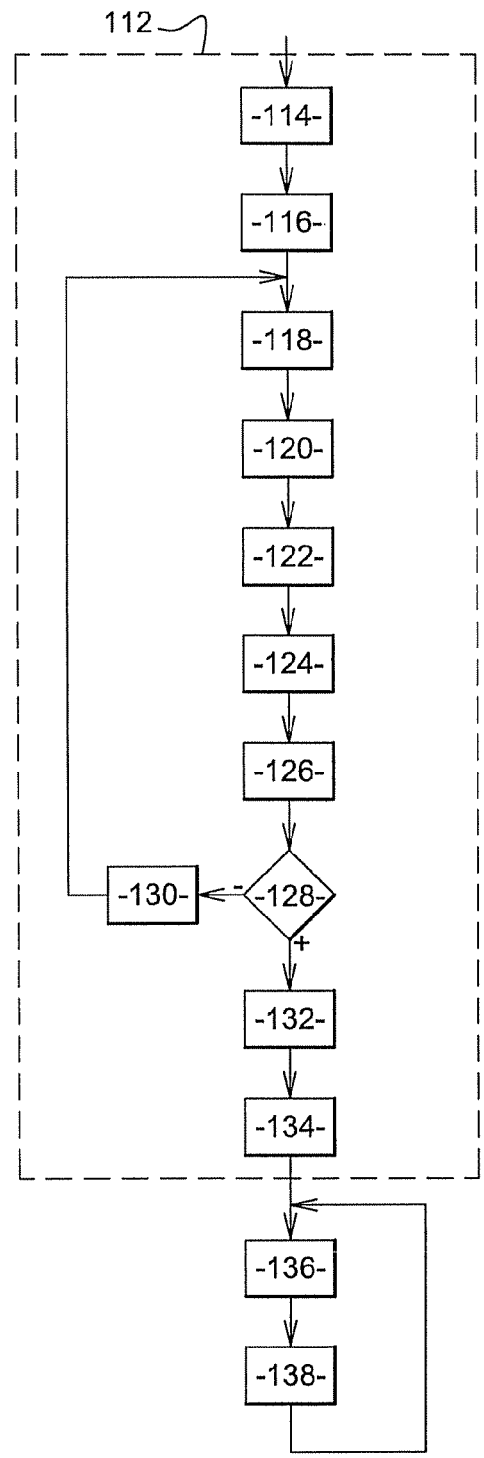
FIG. 4 is a flowchart of a method for measuring and compensating drift in accordance with the second embodiment of the invention.

The method for measuring and compensating drift is similar to that of the second embodiment described in relation to FIG. 4.

The main difference is the fact that, when measuring the drift of bolometer 140, the current integrated by capacitor 42 is no longer the difference between the current that flows through compensation bolometer 50 and reference resistance 56; it is actually the current that flows through compensation bolometer 50.

The second difference is the fact that the integration period is shortened in order to prevent capacitor 42 from saturating. Thus, at the end of an integration cycle, voltage $V_{out}$ on the output of integrator 16 is given by the equation:

$$V_{out} = V_{bus} + \frac{1}{C_{int}} \int_0^{T'_{int}} i_{comp}(t)dt \qquad (6)$$

Correction unit 34 then determines an electrical resistance $R_{comp}$ of compensation bolometer 140 as a function of voltage $V_{out}$.

Alternatively, rather than reducing the integration period, the capacitance value $C_{int}$ of capacitors 42 is increased so that they do not saturate during an integration period $T_{int}$.

For example, integrator 16 comprises two capacitors, the first capacitor being selected by timer circuit 18 when reading imaging array 12 and the second capacitor being selected when measuring the drift of compensation bolometers 50.

It is evident that the four embodiments according to the invention allow spatial correction of the drift of imaging array 12. In fact, the drift of the imaging bolometers is compensated one bolometer at a time for each bolometer in said array (in the case of the first and third embodiments) or it is compensated one column at a time for each column in imaging array 12 (in the case of the second and fourth embodiments).

Fifth Embodiment

According to a fifth embodiment of the invention, the detector is equipped with a system to control the temperature of its focal plane. For example, the detector is equipped with a Peltier-effect module or a Joule-effect heater which are well known in themselves.

In this embodiment, measurement of the drift of the imaging bolometers is identical to that in any of the embodiments described above in relation to FIGS. 1 to 5.

Figure 6:
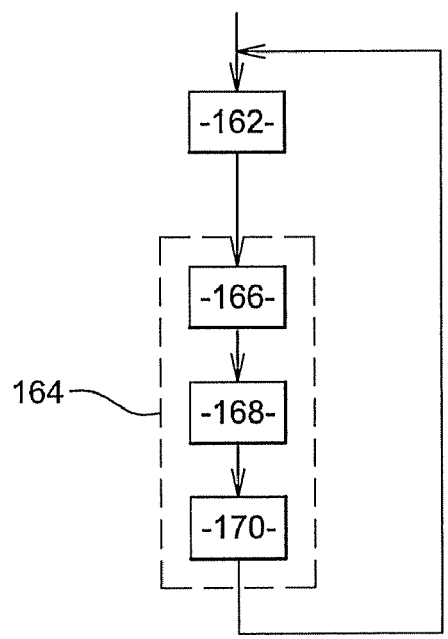
FIG. 6 is a flowchart showing measurement and compensation of drift in accordance with a fifth embodiment of the invention.

In contrast, the drift of the bolometers is corrected "actively" by correcting the drift in the electrical resistance of the bolometers by controlling the temperature of the focal plane as shown in the flowchart in FIG. 6.

In FIG. 6, the method for measuring and correcting the drift of imaging bolometers 140 involves, for instance, a first initial step 160 which comprises step 72 to 94 of the first embodiment followed by drift measurement step 162 which is identical to measurement step 100 in the first embodiment, steps 72-94 and 100 having been described above in relation to FIG. 3.

The method then continues with phase 164 to correct the measured drifts; this is triggered in accordance with criteria that are the same as those described above.

Correction phase 164 comprises a first step 166 in which correction unit 34 of information processing unit 28 calculates an average drift $\overline{\Delta R}_{imag}$ of the n times m bolometers 140 in imaging array 12 or an average drift $\overline{\Delta R}_{comp}$ of compensation bolometers 50. More especially, unit 34 determines the average of the differences $\overline{R}_{imag}-R_{imag}^{ref}$ associated with imaging bolometers 140 in array 12 or the differences $\overline{R}_{comp}-R_{comp}^{ref}$ associated with compensation bolometers 50.

In a subsequent step 166, correction unit 34 calculates, as a function of the average drift $\overline{\Delta R}_{imag}$ (or $\overline{\Delta R}_{comp}$), a temperature setting $T_C$ for the system that controls the temperature of the focal plane. This set point $T_C$ is calculated so that applying it to the focal plane results in the electrical resistances of imaging bolometers 140 being reduced by $\overline{\Delta R}_{imag}$ ($\overline{\Delta R}_{comp}$ respectively). It is known that, over the operating range of detector 10, there is actually a continuously decreasing relationship between the temperature of an imaging bolometer 140 and the value of its electrical resistance. Thus, controlling its temperature is equivalent to controlling its electrical resistance.

Compensation step 164 therefore continues with step 170 to control the temperature of the focal plane to the temperature setting $T_C$.

Finally, step 170 loops back to step 162 in order to measure a new average drift $\overline{\Delta R}_{imag}$ and a new temperature setting $T_C$ that compensates the new drift.

It is apparent that, during operation of detector 10 to form thermal images of the scene, imaging bolometers 14 have their electrical resistance reduced by the value $\overline{\Delta R}_{imag}$ following this correction process by changing the focal-plane temperature. Because of this, the drift in their electrical resistance is actively compensated.

It should also be noted that drift compensation in the fifth embodiment involves compensating the average drift of the imaging bolometers in imaging array 12.

This invention has applications in the field of image sensors that utilize bolometric detection, regardless of the detection frequency band or the type of bolometric material used to fabricate the imaging bolometers and reference bolometers, e.g. amorphous silicon (a-Si), vanadium oxide (Vox) or metallic oxide (Ti).

Thus, the present invention has applications in:
infrared microbolometer pyrometry;
infrared microbolometer imaging;
assisting the driving of a vehicle and detection of pedestrians by infrared microbolometer imaging;
gas measurements by infrared microbolometer imaging; or
more generally, physical measurements using microbolometers.

The invention claimed is:

1. A device for detecting infrared radiation comprising:
a resistive imaging bolometer;
a reference resistor having a constant electrical resistance that is substantially equal to an initial electrical resistance of the resistive imaging bolometer;
a temperature controller for subjecting the resistive imaging bolometer to a reference temperature;
a shutter for subjecting the resistive imaging bolometer to a reference illumination;
an integrator for integrating a difference in currents that flow through the resistive imaging bolometer and the reference resistor;
a read circuit connected to the resistive imaging bolometer for applying electrical stimuli to the resistive imaging bolometer and for outputting an electrical signal in response to the application of electrical stimuli; and
a processing unit connected to the read circuit for determining a temperature of an incident radiation on the resistive imaging bolometer as a function of the electrical signal output by the read circuit and at least one calibration parameter dependent on the initial electrical resistance of the resistive imaging bolometer under conditions of the reference temperature and the reference illumination, the processing unit comprising at least:
a calculation unit for determining a current resistance of the resistive imaging bolometer under the reference temperature and the reference illumination based on the integrated difference in the currents that flow through the resistive imaging bolometer and the reference resistor; and
a correction unit for correcting the at least one calibration parameter based on a drift of the current resistance of the resistive imaging bolometer from the initial electrical resistance of the resistive imaging bolometer.

2. The device according to claim 1, wherein the at least one calibration parameter is an electrical sensitivity to temperature of the electrical signal output by the read circuit.

3. The device according to claim 2, wherein the correction unit multiplies an initial value of said electrical sensitivity to temperature corresponding to said initial resistance of the resistive imaging bolometer by a ratio of said initial electrical resistance of the resistive imaging bolometer to said current electrical resistance of the resistive imaging bolometer.

4. A device for detecting infrared radiation comprising:
a resistive imaging bolometer;
a resistive compensation bolometer of the same type as the resistive imaging bolometer that is substantially insensitive to radiation;
a temperature controller for subjecting the resistive imaging bolometer and the resistive compensation bolometer to a reference temperature;
a shutter for subjecting the resistive imaging bolometer to a reference illumination;
an integrator for integrating a difference in currents that flow through the resistive imaging bolometer and the resistive compensation bolometer;
a read circuit connected to the resistive imaging bolometer for applying electrical stimuli to the resistive imaging bolometer and for outputting an electrical signal in response to the application of electrical stimuli; and
a processing unit connected to the read circuit for determining a temperature of an incident radiation on the resistive imaging bolometer as a function of the electrical signal output by the read circuit and at least one calibration parameter dependent on the initial electrical resistance of the resistive imaging bolometer under conditions of the reference temperature and the reference illumination, the processing unit comprising at least:
a calculation unit for determining a current resistance of the resistive imaging bolometer under the reference temperature and the reference illumination based on the integrated difference in the currents that flow through the resistive imaging bolometer and the resistive compensation bolometer; and
a correction unit for correcting the at least one calibration parameter based on a drift of the current resistance of the resistive imaging bolometer from the initial electrical resistance of the resistive imaging bolometer.

5. A device for detecting infrared radiation comprising:
a resistive imaging bolometer;
a temperature controller for subjecting the resistive imaging bolometer to a reference temperature;
a shutter for subjecting the resistive imaging bolometer to a reference illumination;
an integrator for integrating a current that flows through the resistive imaging bolometer;
a read circuit connected to the resistive imaging bolometer for applying electrical stimuli to the resistive imaging bolometer and for outputting an electrical signal in response to the application of electrical stimuli; and
a processing unit connected to the read circuit for determining a temperature of an incident radiation on the resistive imaging bolometer as a function of the electrical signal output by the read circuit and at least one calibration parameter dependent on the initial electrical resistance of the resistive imaging bolometer under conditions of the reference temperature and the reference illumination, the processing unit comprising at least:
  a calculation unit for determining a current resistance of the resistive imaging bolometer under the reference temperature and the reference illumination based on the integrated current that flows through the resistive imaging bolometer; and
  a correction unit for correcting the at least one calibration parameter based on a drift of the current resistance of the resistive imaging bolometer from the initial electrical resistance of the resistive imaging bolometer.

6. A device for detecting infrared radiation comprising:
a resistive imaging bolometer;
a resistive compensation bolometer of the same type as the resistive imaging bolometer that is substantially insensitive to radiation;
a temperature controller for subjecting the resistive compensation bolometer to a reference temperature;
an integrator for integrating a current that flows through the resistive compensation bolometer;
a read circuit connected to the resistive imaging bolometer for applying electrical stimuli to the resistive imaging bolometer and for outputting an electrical signal in response to the application of electrical stimuli; and
a processing unit connected to the read circuit for determining a temperature of an incident radiation on the resistive imaging bolometer as a function of the electrical signal output by the read circuit and at least one calibration parameter dependent on the initial electrical resistance of the resistive imaging bolometer under conditions of the reference temperature and the reference illumination, the processing unit comprising at least:
  a calculation unit for determining a current resistance of the resistive imaging bolometer under the reference temperature and the reference illumination based on the integrated current that flows through the resistive compensation bolometer; and
  a correction unit for correcting the at least one calibration parameter based on a drift of the current resistance of the resistive imaging bolometer from the initial electrical resistance of the resistive imaging bolometer.

7. A device for detecting infrared radiation comprising:
a resistive imaging bolometer;
a reference resistor having a constant electrical resistance that is substantially equal to an initial electrical resistance of the resistive imaging bolometer;
a temperature controller for subjecting the resistive imaging bolometer to a reference temperature;
a shutter for subjecting the resistive imaging bolometer to a reference illumination;
an integrator for integrating a difference in currents that flow through the resistive imaging bolometer and the reference resistor;
a read circuit connected to the resistive imaging bolometer for applying electrical stimuli to the resistive imaging bolometer and for outputting an electrical signal in response to the application of electrical stimuli; and
a processing unit connected to the read circuit for determining a temperature of an incident radiation on the resistive imaging bolometer as a function of the electrical signal output by the read circuit and at least one calibration parameter dependent on the initial electrical resistance of the resistive imaging bolometer under conditions of the reference temperature and the reference illumination, the processing unit comprising at least a calculation unit for determining a current resistance of the resistive imaging bolometer under the reference temperature and the reference illumination based on the integrated difference in the currents that flow through the resistive imaging bolometer and the reference resistor,
  wherein the temperature controller controls the temperature of the resistive imaging bolometer to compensate for a drift of the current resistance of the resistive imaging bolometer from the initial electrical resistance of the resistive imaging bolometer.

8. A device for detecting infrared radiation comprising:
a resistive imaging bolometer;
a resistive compensation bolometer of the same type as the resistive imaging bolometer that is substantially insensitive to radiation;
a temperature controller for subjecting the resistive imaging bolometer and the resistive compensation bolometer to a reference temperature;
a shutter for subjecting the resistive imaging bolometer to a reference illumination;
an integrator for integrating a difference in currents that flow through the resistive imaging bolometer and the resistive compensation bolometer;
a read circuit connected to the resistive imaging bolometer for applying electrical stimuli to the resistive imaging bolometer and for outputting an electrical signal in response to the application of electrical stimuli; and
a processing unit connected to the read circuit for determining a temperature of an incident radiation on the resistive imaging bolometer as a function of the electrical signal output by the read circuit and at least one calibration parameter dependent on the initial electrical resistance of the resistive imaging bolometer under conditions of the reference temperature and the reference illumination, the processing unit comprising at least a calculation unit for determining a current resistance of the resistive imaging bolometer under the reference temperature and the reference illumination based on the integrated difference in the currents that flow through the resistive imaging bolometer and the resistive compensation bolometer,
wherein the temperature controller controls the temperature of the resistive imaging bolometer to compensate for a drift of the current resistance of the resistive imaging bolometer from the initial electrical resistance of the resistive imaging bolometer.

9. A device for detecting infrared radiation comprising:
a resistive imaging bolometer;
a temperature controller for subjecting the resistive imaging bolometer to a reference temperature;
a shutter for subjecting the resistive imaging bolometer to a reference illumination;
an integrator for integrating a current that flows through the resistive imaging bolometer;
a read circuit connected to the resistive imaging bolometer for applying electrical stimuli to the resistive imaging bolometer and for outputting an electrical signal in response to the application of electrical stimuli; and
a processing unit connected to the read circuit for determining a temperature of an incident radiation on the resistive imaging bolometer as a function of the electrical signal output by the read circuit and at least one calibration parameter dependent on the initial electrical resistance of the resistive imaging bolometer under conditions of the reference temperature and the reference illumination, the processing unit comprising at least a calculation unit for determining a current resistance of the resistive imaging bolometer under the reference temperature and the reference illumination based on the integrated current that flows through the resistive imaging bolometer,
wherein the temperature controller controls the temperature of the resistive imaging bolometer to compensate for a drift of the current resistance of the resistive imaging bolometer from the initial electrical resistance of the resistive imaging bolometer.

10. A device for detecting infrared radiation comprising:
a resistive imaging bolometer;
a resistive compensation bolometer of the same type as the resistive imaging bolometer that is substantially insensitive to radiation;
a temperature controller for subjecting the resistive compensation bolometer to a reference temperature;
an integrator for integrating a current that flows through the resistive compensation bolometer;
a read circuit connected to the resistive imaging bolometer for applying electrical stimuli to the resistive imaging bolometer and for outputting an electrical signal in response to the application of electrical stimuli; and
a processing unit connected to the read circuit for determining a temperature of an incident radiation on the resistive imaging bolometer as a function of the electrical signal output by the read circuit and at least one calibration parameter dependent on the initial electrical resistance of the resistive imaging bolometer under conditions of the reference temperature and the reference illumination, the processing unit comprising at least a calculation unit for determining a current resistance of the resistive imaging bolometer under the reference temperature and the reference illumination based on the integrated current that flows through the resistive compensation bolometer,
wherein the temperature controller controls the temperature of the resistive imaging bolometer to compensate for a drift of the current resistance of the resistive imaging bolometer from the initial electrical resistance of the resistive imaging bolometer.

11. A system for detecting infrared radiation comprising:
at least one row of resistive imaging bolometers;
a read circuit connected to each of the resistive imaging bolometers for applying electrical stimuli to each of the resistive imaging bolometers and for outputting an electrical signal in response to the application of electrical stimuli;
a processing unit connected to the read circuit for determining a temperature of an incident radiation on each of the resistive imaging bolometers as a function of the electrical signal output by the read circuit and at least one calibration parameter dependent on the initial electrical resistance of the resistive imaging bolometer under conditions of the reference temperature and the reference illumination; and
a circuit assembly for measuring a drift in a current electrical resistance of each of the resistive imaging bolometers under the reference temperature and the reference illumination,
said circuit assembly comprising:
a reference resistor having a constant electrical resistance that is substantially equal to an initial electrical resistance of the resistive imaging bolometer;
a temperature controller for subjecting the resistive imaging bolometer to a reference temperature;
a shutter for subjecting the resistive imaging bolometer to a reference illumination;
an integrator for integrating a difference in currents that flow through the resistive imaging bolometer and the reference resistor;
a calculation unit for determining a current resistance of the resistive imaging bolometer under the reference temperature and the reference illumination based on the integrated difference in the currents that flow through the resistive imaging bolometer and the reference resistor; and
a correction unit for correcting the at least one calibration parameter of each resistive imaging bolometer based on a drift of the current resistance of the resistive imaging bolometer from the initial electrical resistance of the resistive imaging bolometer.

12. A system for detecting infrared radiation comprising:
at least one row of resistive imaging bolometers;
a read circuit connected to each of the resistive imaging bolometers for applying electrical stimuli to each of the resistive imaging bolometers and for outputting an electrical signal in response to the application of electrical stimuli;
a processing unit connected to the read circuit for determining a temperature of an incident radiation on each of the resistive imaging bolometers as a function of the electrical signal output by the read circuit and at least one calibration parameter dependent on the initial electrical resistance of the resistive imaging bolometers under conditions of a reference temperature and a reference illumination; and
a circuit assembly for measuring a drift in a current electrical resistance of each of the resistive imaging bolometers under the reference temperature and the reference illumination from the initial resistance of each of the resistive imaging bolometers under the reference temperature and the reference illumination,
said circuit assembly comprising:
a reference resistor having a constant electrical resistance that is substantially equal to an initial electrical resistance of the resistive imaging bolometer;
a temperature controller for subjecting the resistive imaging bolometer to a reference temperature;
a shutter for subjecting the resistive imaging bolometer to a reference illumination;

an integrator for integrating a difference in currents that flow through the resistive imaging bolometer and the reference resistor; and a calculation unit for determining a current resistance of the resistive imaging bolometer under the reference temperature and the reference illumination based on the integrated difference in the currents that flow through the resistive imaging bolometer and the reference resistor, wherein the temperature controller controls the temperature of the resistive imaging bolometers to compensate for a drift of the current resistance of the resistive imaging bolometers from the initial electrical resistance of the resistive imaging bolometers.

13. The system in accordance with claim 12, wherein the calculation unit calculates a mean value of differences between the respective current resistances and the initial resistances, and wherein the temperature controller subjects each of the resistive imaging bolometers in the at least one row of resistive imaging bolometers to a temperature that compensates said mean value of differences.

14. A method for correcting an effect of a drift in electrical resistance of a resistive imaging bolometer of a device for detecting infrared radiation, said device comprising said resistive imaging bolometer, a read circuit connected to the resistive imaging bolometer for applying electrical stimuli to the resistive imaging bolometer and for outputting an electrical signal in response to the application of electrical stimuli, and a processing unit connected to the read circuit for determining a temperature of an incident radiation on the resistive imaging bolometer as a function of the electrical signal output by the read circuit and at least one calibration parameter dependent on the initial electrical resistance of the resistive imaging bolometer under conditions of a reference temperature and a reference illumination, the method comprising the steps of:

subjecting said resistive imaging bolometer to conditions of the reference temperature and the reference illumination;

integrating a difference in currents that flow through said resistive imaging bolometer and a reference resistor having a constant electrical resistance that is substantially equal to an initial electrical resistance of said resistive imaging bolometer;

determining a current resistance of said resistive imaging bolometer under the reference temperature and the reference illumination based on the integrated difference in the currents that flow through said resistive imaging bolometer and the reference resistor; and correcting the at least one calibration parameter based on the drift of the current resistance of the resistive imaging bolometer from the initial electrical resistance of the resistive imaging bolometer.

15. A method for correcting an effect of a drift in electrical resistance of a resistive imaging bolometer of a device for detecting infrared radiation, said device comprising said resistive imaging bolometer, a read circuit connected to the resistive imaging bolometer for applying electrical stimuli to the resistive imaging bolometer and for outputting an electrical signal in response to the application of electrical stimuli, and a processing unit connected to the read circuit for determining a temperature of an incident radiation on the resistive imaging bolometer as a function of the electrical signal output by the read circuit and at least one calibration parameter dependent on the initial electrical resistance of the resistive imaging bolometer under conditions of a reference temperature and a reference illumination, the method comprising the steps of:

subjecting said resistive imaging bolometer and a resistive compensation bolometer of the same type as said resistive imaging bolometer and substantially insensitive to radiation to conditions of the reference temperature and the reference illumination;

integrating a difference in currents that flow through said resistive imaging bolometer and the resistive compensation bolometer;

determining a current resistance of said resistive imaging bolometer under the reference temperature and the reference illumination based on the integrated difference in the currents that flow through said resistive imaging bolometer and the resistive compensation bolometer; and correcting the at least one calibration parameter based on the drift of the current resistance of the resistive imaging bolometer from the initial electrical resistance of the resistive imaging bolometer.

16. The device according to claim 15, wherein the at least one calibration parameter is an electrical sensitivity to temperature of the electrical signal output by the read circuit.

17. The device according to claim 16, wherein the step of correcting further comprises multiplying an initial value of said electrical sensitivity to temperature corresponding to said initial resistance of the resistive imaging bolometer by a ratio of said initial electrical resistance of the resistive imaging bolometer to said current electrical resistance of the resistive imaging bolometer.

18. A method for correcting an effect of a drift in electrical resistance of a resistive imaging bolometer of a device for detecting infrared radiation, said device comprising said resistive imaging bolometer, a read circuit connected to the resistive imaging bolometer for applying electrical stimuli to the resistive imaging bolometer and for outputting an electrical signal in response to the application of electrical stimuli, and a processing unit connected to the read circuit for determining a temperature of an incident radiation on the resistive imaging bolometer as a function of the electrical signal output by the read circuit and at least one calibration parameter dependent on the initial electrical resistance of the resistive imaging bolometer under conditions of a reference temperature and a reference illumination, the method comprising the steps of:

subjecting said resistive imaging bolometer to the reference temperature and the reference illumination;

integrating a current that flows through said resistive imaging bolometer;

determining a current resistance of said resistive imaging bolometer under the reference temperature and the reference illumination based on the integrated current that flows through said resistive imaging bolometer; and correcting the at least one calibration parameter based on the drift of the current resistance of the resistive imaging bolometer from the initial electrical resistance of the resistive imaging bolometer.

19. A method for correcting an effect of a drift in electrical resistance of a resistive imaging bolometer of a device for detecting infrared radiation, said device comprising said resistive imaging bolometer, a read circuit connected to the resistive imaging bolometer for applying electrical stimuli to the resistive imaging bolometer and for outputting an electrical signal in response to the application of electrical stimuli, and a processing unit connected to the read circuit for determining a temperature of an incident radiation on the resistive imaging bolometer as a function of the electrical signal output by the read circuit and at least one calibration parameter dependent on the initial electrical resistance of the resistive imaging bolometer under conditions of a reference temperature and a reference illumination, the method comprising the steps of:

subjecting a resistive compensation bolometer of the same type as said resistive imaging bolometer that is substantially insensitive to radiation to conditions of the reference temperature and the reference illumination;

integrating a current that flows through the resistive compensation bolometer;

determining a current resistance of said resistive imaging bolometer under the reference temperature and the reference illumination based on the integrated current that flows through the resistive compensation bolometer; and correcting the at least one calibration parameter based on the drift of the current resistance of the resistive imaging bolometer from the initial electrical resistance of the resistive imaging bolometer.

20. A method for correcting a drift in electrical resistance of a resistive imaging bolometer of a device for detecting infrared radiation, said device comprising said resistive imaging bolometer, a read circuit connected to the resistive imaging bolometer for applying electrical stimuli to the resistive imaging bolometer and for outputting an electrical signal in response to the application of electrical stimuli, and a processing unit connected to the read circuit for determining a temperature of an incident radiation on the resistive imaging bolometer as a function of the electrical signal output by the read circuit and at least one calibration parameter dependent on the initial electrical resistance of the resistive imaging bolometer under conditions of a reference temperature and a reference illumination, the method comprising the steps of:

subjecting said resistive imaging bolometer to conditions of the reference temperature and the reference illumination;

integrating a difference in currents that flow through said resistive imaging bolometer and a reference resistor having a constant electrical resistance that is substantially equal to an initial electrical resistance of said resistive imaging bolometer;

determining a current resistance of said resistive imaging bolometer under the reference temperature and the reference illumination based on the integrated difference in the currents that flow through said resistive imaging bolometer and the reference resistor; and controlling the temperature of the resistive imaging bolometer to compensate for the drift of the current resistance of the resistive imaging bolometer from the initial electrical resistance of the resistive imaging bolometer.

21. A method for correcting a drift in electrical resistance of a resistive imaging bolometer of a device for detecting infrared radiation, said device comprising said resistive imaging bolometer, a read circuit connected to the resistive imaging bolometer for applying electrical stimuli to the resistive imaging bolometer and for outputting an electrical signal in response to the application of electrical stimuli, and a processing unit connected to the read circuit for determining a temperature of an incident radiation on the resistive imaging bolometer as a function of the electrical signal output by the read circuit and at least one calibration parameter dependent on the initial electrical resistance of the resistive imaging bolometer under conditions of a reference temperature and a reference illumination, the method comprising the steps of:

subjecting said resistive imaging bolometer and a resistive compensation bolometer of the same type as said resistive imaging bolometer and substantially insensitive to radiation to conditions of the reference temperature and the reference illumination;

integrating a difference in currents that flow through said resistive imaging bolometer and the resistive compensation bolometer;

determining a current resistance of said resistive imaging bolometer under the reference temperature and the reference illumination based on the integrated difference in the currents that flow through said resistive imaging bolometer and the resistive compensation bolometer; and controlling the temperature of the resistive imaging bolometer to compensate for the drift of the current resistance of the resistive imaging bolometer from the initial electrical resistance of the resistive imaging bolometer.

22. A method for correcting a drift in electrical resistance of a resistive imaging bolometer of a device for detecting infrared radiation, said device comprising said resistive imaging bolometer, a read circuit connected to the resistive imaging bolometer for applying electrical stimuli to the resistive imaging bolometer and for outputting an electrical signal in response to the application of electrical stimuli, and a processing unit connected to the read circuit for determining a temperature of an incident radiation on the resistive imaging bolometer as a function of the electrical signal output by the read circuit and at least one calibration parameter dependent on the initial electrical resistance of the resistive imaging bolometer under conditions of a reference temperature and a reference illumination, the method comprising the steps of:

subjecting said resistive imaging bolometer to the reference temperature and the reference illumination;

integrating a current that flows through said resistive imaging bolometer;

determining a current resistance of said resistive imaging bolometer under the reference temperature and the reference illumination based on the integrated current that flows through said resistive imaging bolometer; and controlling the temperature of the resistive imaging bolometer to compensate for the drift of the current resistance of the resistive imaging bolometer from the initial electrical resistance of the resistive imaging bolometer.

23. A method for correcting a drift in electrical resistance of a resistive imaging bolometer of a device for detecting infrared radiation, said device comprising said resistive imaging bolometer, a read circuit connected to the resistive imaging bolometer for applying electrical stimuli to the resistive imaging bolometer and for outputting an electrical signal in response to the application of electrical stimuli, and a processing unit connected to the read circuit for determining a temperature of an incident radiation on the resistive imaging bolometer as a function of the electrical signal output by the read circuit and at least one calibration parameter dependent on the initial electrical resistance of the resistive imaging bolometer under conditions of a reference temperature and a reference illumination, the method comprising the steps of:

subjecting a resistive compensation bolometer of the same type as said resistive imaging bolometer that is substantially insensitive to radiation to conditions of the reference temperature and the reference illumination;

integrating a current that flows through the resistive compensation bolometer;

determining a current resistance of said resistive imaging bolometer under the reference temperature and the reference illumination based on the integrated current that flows through the resistive compensation bolometer; and controlling the temperature of the resistive imaging bolometer to compensate for the drift of the current resistance of the resistive imaging bolometer from the initial electrical resistance of the resistive imaging bolometer.

\* \* \* \* \*